A. A. TOWERS.
AUTOMOBILE SIDE AND DOOR CURTAIN.
APPLICATION FILED OCT. 25, 1913. RENEWED NOV. 30, 1918.
1,322,975. Patented Nov. 25, 1919.
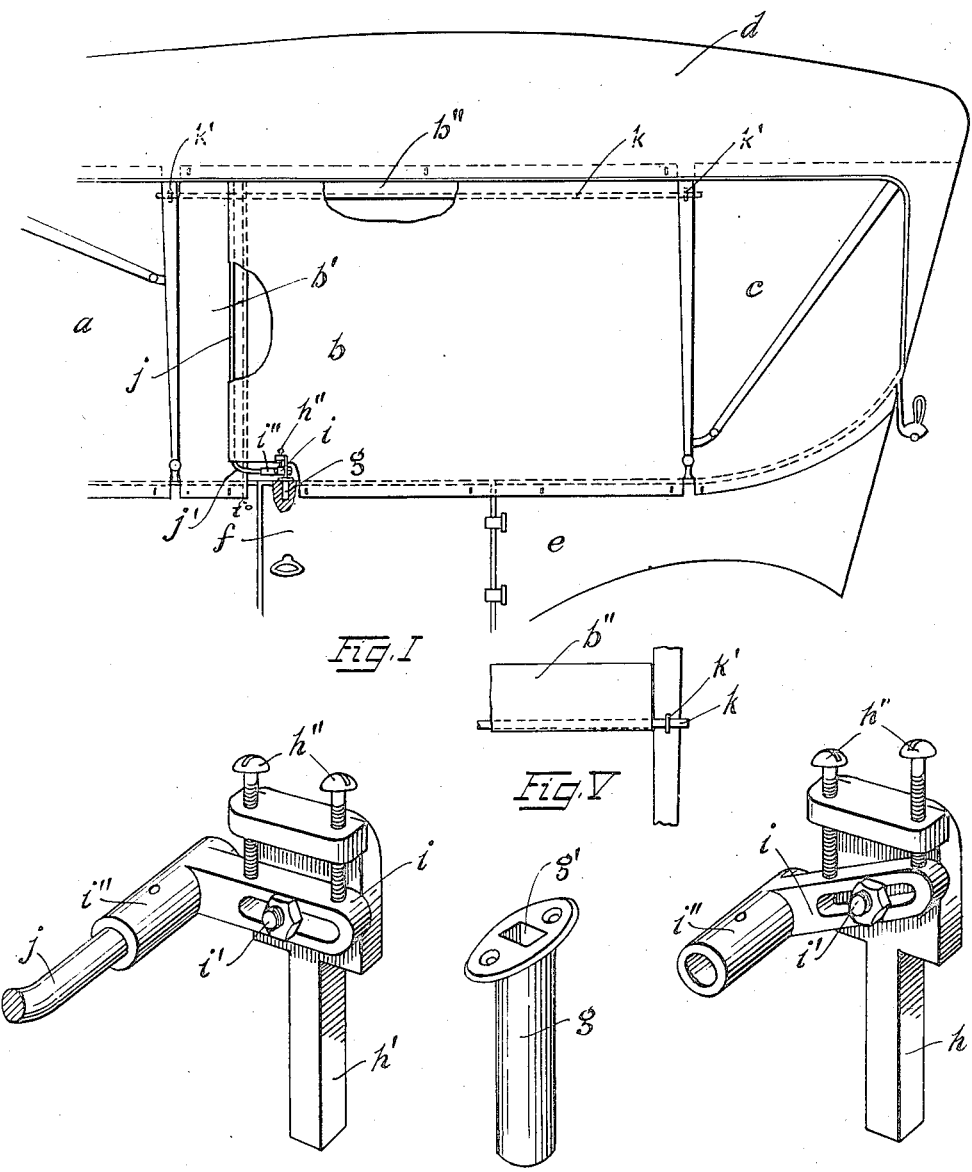

UNITED STATES PATENT OFFICE.

ARTHUR ALDERTON TOWERS, OF CLEVELAND, OHIO, ASSIGNOR TO WILLIAM E. BLACKIE, OF CLEVELAND, OHIO.

AUTOMOBILE SIDE AND DOOR CURTAIN.

1,322,975.      Specification of Letters Patent.      Patented Nov. 25, 1919.

Application filed October 25, 1913, Serial No. 797,906. Renewed November 30, 1918. Serial No. 264,878.

*To all whom it may concern:*

Be it known that I, ARTHUR ALDERTON TOWERS, a subject of the King of England, residing at Cleveland, in the county of Cuyahoga and State of Ohio, have invented certain new and useful Improvements in Automobile Side and Door Curtains, of which the following is a specification, reference being had to the accompanying drawings thereof.

My invention relates to improvements in supports for automobile side-curtains, and has for its object the provision of means for effectively supporting and coöperating with the side-curtain section associated with an automobile door. Preferably said supporting means are readily removable from the door, but when positioned thereon, swing with said door to open and close the upper portion of the opening. My improvements are devised for application to practically any make or style of automobile and automobile top, and as these vary materially in detail, I have sought to construct my improved device in the simplest and most adaptable form possible.

The present device primarily depends upon supporting the meeting edge of the swinging side-curtain, by means of a resilient rod inserted therein or attached thereto, and optionally mounted in a removable adjustable bracket seated in the top of the door. This meeting edge engages a supported side curtain section parallel therewith and an abutment preferably in the form of a rod extending between adjacent bows supporting the automobile top; said rod preferably bordering an upper side curtain section. These stationary horizontal and vertical side-curtain sections normally are overlapped respectively by the top and outer edges of the swinging side-curtain section to exclude dust, wind, rain and snow. Details of these improvements will be readily understood by making reference to the accompanying drawings, wherein:—

Figure I shows in partial side elevation, an automobile tonneau and top equipped with my invention; the door being shown closed and its curtain drawn taut against the reinforced side and top curtain sections.

Fig. II is an enlarged view of the bracket and screw-adjusting means with the attached curtain supporting rod broken away.

Fig. III is a similar view of said parts (omitting the rod) to illustrate the extreme adjustment obtainable.

Fig. IV is a view showing the socket insertible within the body of the door, and Fig. V is a fragmentary view illustrating the top curtain, its reinforced rod and the mounting thereof.

Throughout the said drawings, I have employed the same character of reference to indicate similar parts.

Several side-curtain sections, as $a$, $b$ and $c$, shown herein as inside curtains, are supplied for the top $d$ mounted upon the tonneau body $e$. The middle section $b$ is mounted to swing freely with the door $f$ by means of my improved appliance. Thus section $b$ is adapted to be opened and closed with the side door, and requires no attention when the occupants desire to enter or leave the vehicle. Both front and rear doors may be thus equipped, and my improvement, moreover, is adapted for use either upon the right or left hand door of a vehicle.

The socket $g$, with squared opening $g'$ is set into the top of the door as near to its swinging edge as the construction thereof will readily permit. This socket is adapted to receive the squared shank $h'$ of an adjusting bracket, provided with two screws $h''$. These screws bear upon a slotted arm $i$ on opposite sides of a pivotal bolt $i'$. Within the sleeve $i''$ terminating said arm, there is rigidly secured a resilient rod $j$ of cold-rolled steel. Initially this rod affords a sufficient length for bending it into the desired shape and provides an upright section equivalent to the height of any side-curtain. Upon fitting the support to the side-curtain and door, said rod is bent substantially at right angles at $j'$ so that the upright section will fit within the hemmed edge of side-curtain section $b$ and draw said section taut when the door is in its closed position, with the edge resting against and overlapping side-curtain section $b'$. The rod $j$ within the edge of the swinging side curtain *b* materially overlaps side curtain section *b'* and serves positively to hold them substantially in weather-proof relation so that the edges need not be buttoned or otherwise fastened. This rod, accordingly, must be rigidly secured in any suitable manner adjacent to the swinging edge of the automobile door *f*, but preferably removable therefrom when desired.

Unless the support is properly restrained, it is apparent that the upper end of the rod *j* and its connecting side-curtains will be subject to more or less vibration when the automobile is in motion. To guard against this and provide an abutment and upper closing edge for side-curtain section *b*, I have provided the rod *k* which is held in screw-eyes *k'* inserted in adjacent bows of the automobile top. An upper side curtain section *b''* is hemmed to inclose said rod *k* and is attached along its upper edge, beneath the automobile top to close the opening above the door.

Accordingly, when the door is closed and side-curtain section *b* is drawn taut by rod *j*, said rod will engage side-curtain section *b'* and resiliently press against rod *k*. By reason of angularly bending the rod *j* beyond the edge of door *f*, the swinging side-curtain section *b* is caused vertically to overlap section *b'*, while its upper horizontal edge is held taut and closely in overlapping relation with section *b''*; thus effectually closing the opening above the door against the entrance of dust or rain. However, the side-curtain section *b* clears and swings freely beneath the downturned edge of the auto top *d*, and against the valance *b*.

Various makes of such tops require different adjustments, and when these are necessitated, I provide means therefor, found in the screw-adjustment of Figs. II and III. It will be apparent that the angular position of rod *j*, with respect to the door and its alinement with the top, are subject to adjustment by sliding the slotted arm *i* upon its pivot-bolt and adjusting its angular position by means of the screws *h''*, through loosening one screw and tightening the other. More important still, the said rod is attached only at its lower end, and is resilient in all vertical planes; particularly in the plane occupied by the door and in a lateral direction at right angles thereto, whereby the curtain is drawn taut and the rod is engaged against longitudinal and transverse abutments for effectually closing the door space and preventing rattling.

All of the side curtain sections are removably held in place by means of the usual turn-buttons, and my improved support for the central side-curtain section may be readily slipped out of its hemmed edge and the supporting bracket is as easily lifted out of its socket in the door. The associated side-curtain sections *b'* and *b''* are quite as easily removed, when desired, thereby freeing the automobile top from any obstructing parts, although normally forming suitable abutments for the swinging side-curtain section, when the latter is in use, to make the same practically weather-proof. I have shown herein but one type of auto top equipped with my invention, by way of illustration, and it should be understood that said invention is not necessarily limited to the details set forth, except as these are hereinafter claimed. It will be observed that all the parts are simple, few in number and easily applicable to an automobile top and door.

Having now explained the preferred embodiment of my invention, I claim as new and desire to secure by Letters Patent the following:—

1. In combination with a vehicle top and door, a side-curtain section supported by the top adjacent to the hinged side of the door, a removable bracket supported by the door adjacent to its swinging corner, a resilient rod carried by said bracket whereon the said curtain swings and is supported along its free or swinging edge, a removable rod supported by the top in position to form a relatively rigid abutment for the upper end of the resilient rod, and a top side-curtain section supported by the rod forming an abutment, substantially as set forth.

2. A removable attachment for vehicle curtains, comprising a bracket-member, a pivotal bolt, a slotted arm adjustably mounted upon the bracket by said bolt, a resilient rod carried in a substantially upright position by said arm, and adjusting screws bearing upon said arm and adapted to alter its angular position with respect to the bracket, substantially as set forth.

3. A removable attachment for automobile door curtains, comprising a bracket-member, a socket therefor attachable to the door, an integral resilient curtain-rod and slotted supporting arm, a pivotal bolt extending through the slot and mounting the arm upon said bracket, and adjusting screws bearing upon said arm and adapted to adjust the angular position of the arm and rod with respect to the bracket, substantially as set forth.

4. In combination with a vehicle top and door, a side curtain section corresponding with the door, a resilient rod inserted within the edge of said section and supporting it to swing with the door and draw the curtain section taut in its closed position, an adjustable bracket for said rod removably carried by the door, a side curtain section substantially parallel with the rod and a reinforced top curtain section substantially at right angles with the rod and forming an abutment for its upper end, substantially as set forth.

5. The combination with a vehicle top and door, of stationary side-curtain sections vertically and horizontally attached adjacent to and about the door opening, a side-curtain section corresponding with the door rearwardly attached to the top, a resilient rod carried by the swinging edge of the door to which the free edge of the corresponding side-curtain section is secured and adapted to be drawn taut in overlapping relation in the closed position of the door, substantially as set forth.

6. In combination with a vehicle top and door, a side-curtain section corresponding with said door and rearwardly attached to a top member, a resilient rod attached at its lower end adjacent to the swinging edge of the door, to which rod the free edge of said side-curtain section is secured and adapted to be drawn taut in its closed position, and an upper side-curtain section stationarily mounted above the door opening in position to be engaged in overlapping relation by the swinging side-curtain section, substantially as set forth.

7. In combination with a vehicle top and door, a side-curtain section mounted to swing with the door and rearwardly attached to a top member, a coacting stationary side-curtain and a spring rod attached at its lower end adjacent to the swinging edge of the door and outwardly tensioned in the plane of said door, to which rod the edge of the first-named side-curtain section is secured and adapted to be drawn taut in overlapping relation of the rod and curtain with the stationary side-curtain in the closed position of the door, substantially as set forth.

8. In combination with a vehicle top and door, a side-curtain section rearwardly supported and mounted to swing with said door, a spring rod attached at its lower end adjacent to the swinging edge of the door and supporting the free edge of the side-curtain section; said rod being outwardly tensioned in the plane of the door to draw the curtain taut in its closed position, and vertical and horizontal side-curtain sections attached adjacent to and about the door opening, adapted to be engaged by the first-named side-curtain section in overlapping relation of the rod and curtain when the door is closed, substantially as set forth.

9. In combination with a vehicle top and door, an upper and a vertical side-curtain section disposed about the door opening, a swinging side-curtain section corresponding to the door, and a resilient outwardly tensioned spring rod carrying the free edge of said swinging side-curtain section from the free edge of the door and adapted to draw the same taut in overlapping relation with respect to the upper and vertical sections when the door is swung to its closed position, substantially as set forth.

10. In combination with a vehicle top and door, a side-curtain section disposed vertically beyond the door opening, a swinging side-curtain section rearwardly attached, and a tensioned spring rod carrying the free edge of said swinging side-curtain section above and beyond the door and adapted to draw the same taut with the rod and edge of said side-curtain section both in overlapping relation with the first-named side-curtain section when the door is swung to its closed position, substantially a set forth.

11. In combination with a vehicle top and door, a side-curtain section mounted to swing with the door and rearwardly attached to a top member, a coacting forward side-curtain also attached to the top, and a supporting rod secured at its lower end adjacent to the swinging edge of the door and angularly bent substantially into vertical position beyond said edge, to which rod the edge of the first named side-curtain section is attached and adapted to be actuated into overlapping engagement of the rod and curtain with the forward side-curtain in the closed position of the door, substantially as set forth.

12. In combination with a vehicle top and door, a side-curtain section mounted to swing with the door and rearwardly attached to a top member, a co-acting stationary side-curtain section, and a spring rod attached at its lower end adjacent to the swinging edge of said door and outwardly tensioned in the plane of the door; said rod being inserted within the edge of the first named side-curtain section and adapted by its tension to draw said section taut with both members in overlapping relation to the stationary side-curtain section in the closed position of the door, substantially as set forth.

13. In combination with a vehicle top and door, a side-curtain section rearwardly attached to a top member, a co-acting stationary side-curtain section beyond the edge of the door, and a spring rod attached at its lower end adjacent to the swinging edge of the door and outwardly tensioned in the plane of said door, to which rod the edge of the first named side-curtain section is secured and is adapted to be drawn taut with both in overlapping relation to the stationary side-curtain section in the closed position of the door, substantially as set forth.

14. In combination with a vehicle top and door, a side-curtain section rearwardly attached to a top member, a co-acting stationary top curtain section above the door opening, a spring rod attached at its lower end adjacent to the swinging edge of the door and outwardly tensioned in the plane of said door, to which rod the edge of the side-curtain section is secured and which is adapted to be drawn taut adjacent to the stationary top curtain section in the closed position of the door, and means for adjusting the position of the rod substantially at right angles to the plane of the door, substantially as set forth.

In testimony whereof I do now affix my signature in the presence of two witnesses.

ARTHUR ALDERTON TOWERS.

Witnesses:
A. C. KNIGHT,
ALBERT LYNN LAWRENCE.